July 19, 1955 C. F. WALLACE 2,713,267
PRESSURE TOTALIZING APPARATUS
Filed June 8, 1951 3 Sheets-Sheet 1

INVENTOR.
Charles F. Wallace
BY
Robert S. Dunham
ATTORNEY

July 19, 1955    C. F. WALLACE    2,713,267
PRESSURE TOTALIZING APPARATUS
Filed June 8, 1951    3 Sheets-Sheet 2
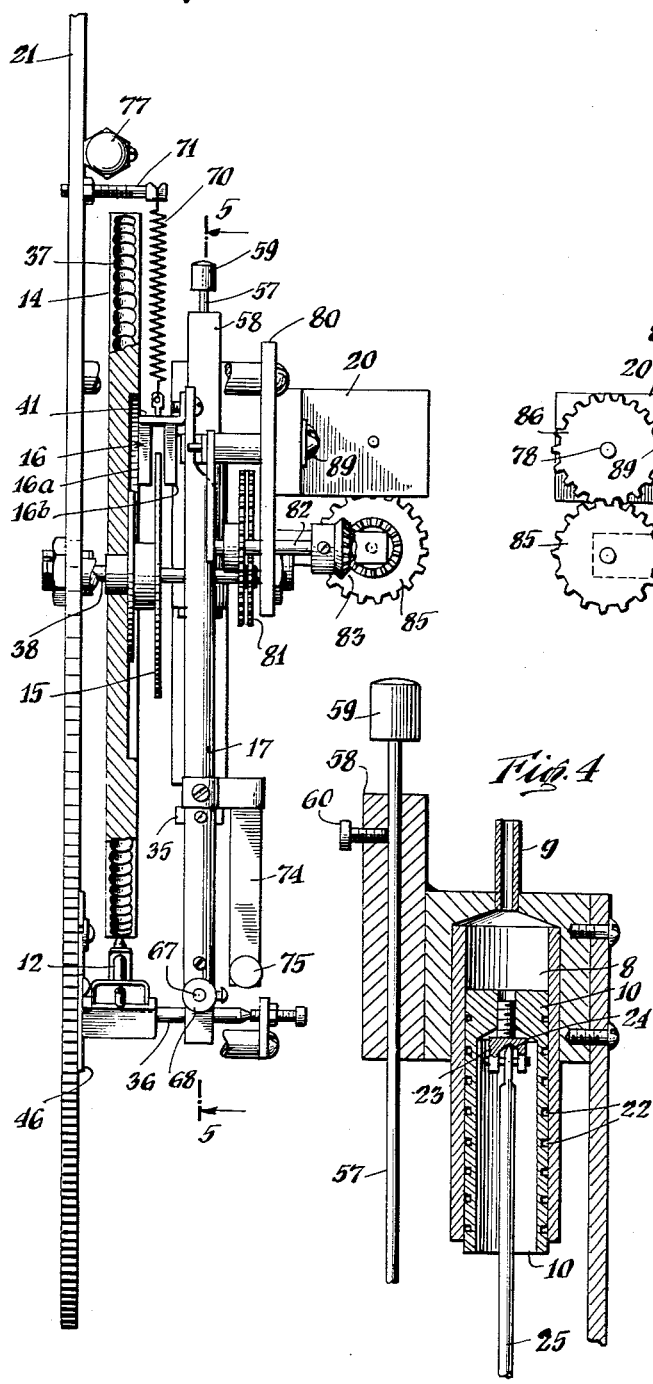
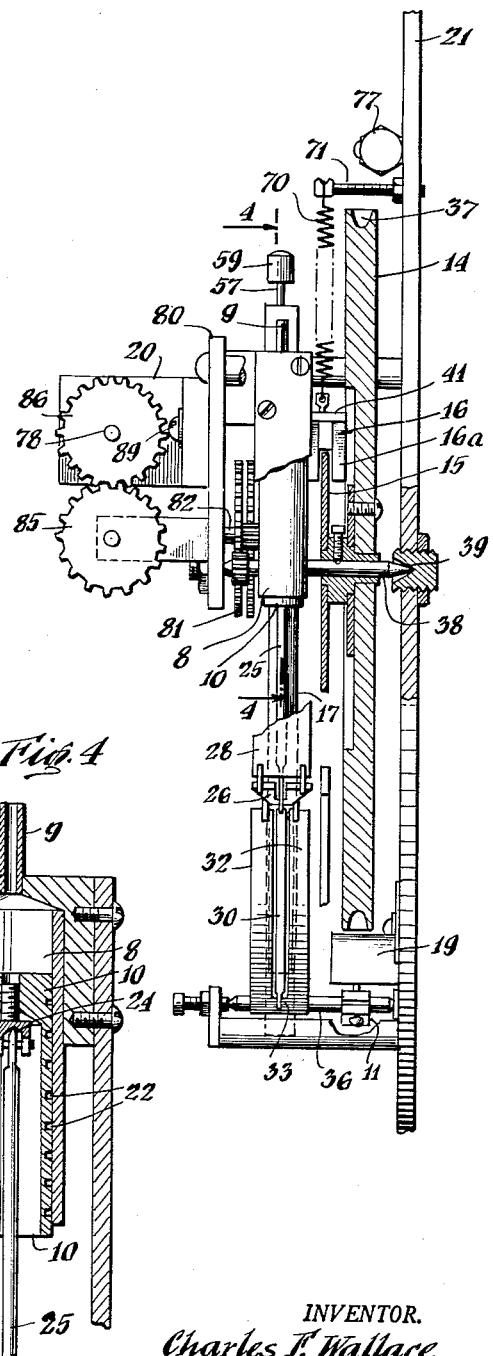
INVENTOR.
Charles F. Wallace
BY Robert S. Dunham
ATTORNEY July 19, 1955

C. F. WALLACE 2,713,267

PRESSURE TOTALIZING APPARATUS

Filed June 8, 1951

INVENTOR.
Charles F. Wallace
BY
Robert S. Dunham
ATTORNEY

United States Patent Office 2,713,267
Patented July 19, 1955

2,713,267

PRESSURE TOTALIZING APPARATUS

Charles F. Wallace, Westfield, N. J., assignor to Wallace & Tiernan Incorporated, a corporation of Delaware Application June 8, 1951, Serial No. 230,641

16 Claims. (Cl. 73—388)

This invention relates to pressure totalizing apparatus, particularly apparatus for integrating successive values of fluid pressure as communicated from a given source. In a more particular sense, the invention is designed to provide a sensitive, accurate and reliable instrument from which a reading or other translated response may be obtained, representative of the totalized value of the fluid pressure over a selected interval. Apparatus of this character finds utility in association with devices or systems wherein fluid pressure, particularly as it may vary from time to time, is directly or secondarily representative of conditions that require measurement or for which control is desired.

By way of example, certain types of scale feeding apparatus, for handling divided dry material, embody pressure-actuated control instrumentalities of such nature that the operating pressure of air or the like is significant, at any time, of the amount of material traversing the feeder. In consequence, apparatus of the present invention is particularly adapted for use with equipment of the above or like character, i. e. to provide a totalized indication, over any given period, of the modulated pressure communicated from the feeding or flow metering mechanism. The integrated reading thus represents a measure of the total amount of material fed during the stated period. It will be appreciated that feeding devices of the character mentioned may be designed or operated to maintain a predetermined constant rate, or may serve simply as measuring means to determine the rate of supply of the material; in either case, the utility of the present apparatus may be the same, i. e. in totalizing the significant fluid pressure and thus correspondingly, the successive quantities of material. It will be understood that the apparatus is also adapted for a variety of other uses, i. e. wherever integration of changing or changeable pressure values is desired.

Further objects of the invention are to provide pressure totalizing apparatus of unusually sensitive and yet fully rugged and reliable character, adapted for response to relatively small pressure changes, or correspondingly adaptable to application for measuring pressures in any of a wide variety of ranges, above or below atmospheric. A further object is to provide apparatus of the character described which is easily balanced or calibrated for operation under selected circumstances, and which is essentially unaffected, in its response, to surrounding conditions such as changes of temperature.

A particular object of the invention is to provide a pressure integrating instrument which is essentially mechanical in its operation, involving moving parts energized by a source of air or other gas under pressure, and arranged so that the energizing stream of air does not in itself require any critical regulation. An additional object is to afford a sensitive but inherently stable mechanism responsive to small pressure changes, for converting such changes into continuous or like operation of a movable element with sufficient driving power to operate a counter or other translating means.

To these and other ends, a presently preferred embodiment of the invention is shown in the accompanying drawings and hereinbelow described, by way of example, to illustrate the several features and principles of the apparatus.

Referring to the drawings:

Fig. 2 is an elevation of the left-hand side of the device of Fig. 1, with certain structure in vertical section;

Fig. 3 is an elevation of the right-hand side of Fig. 1, also with certain parts in vertical section;

Fig. 4 is an enlarged detail, taken in section on line 4—4 of Fig. 3, of the cylinder and piston assembly;

Figure 1:
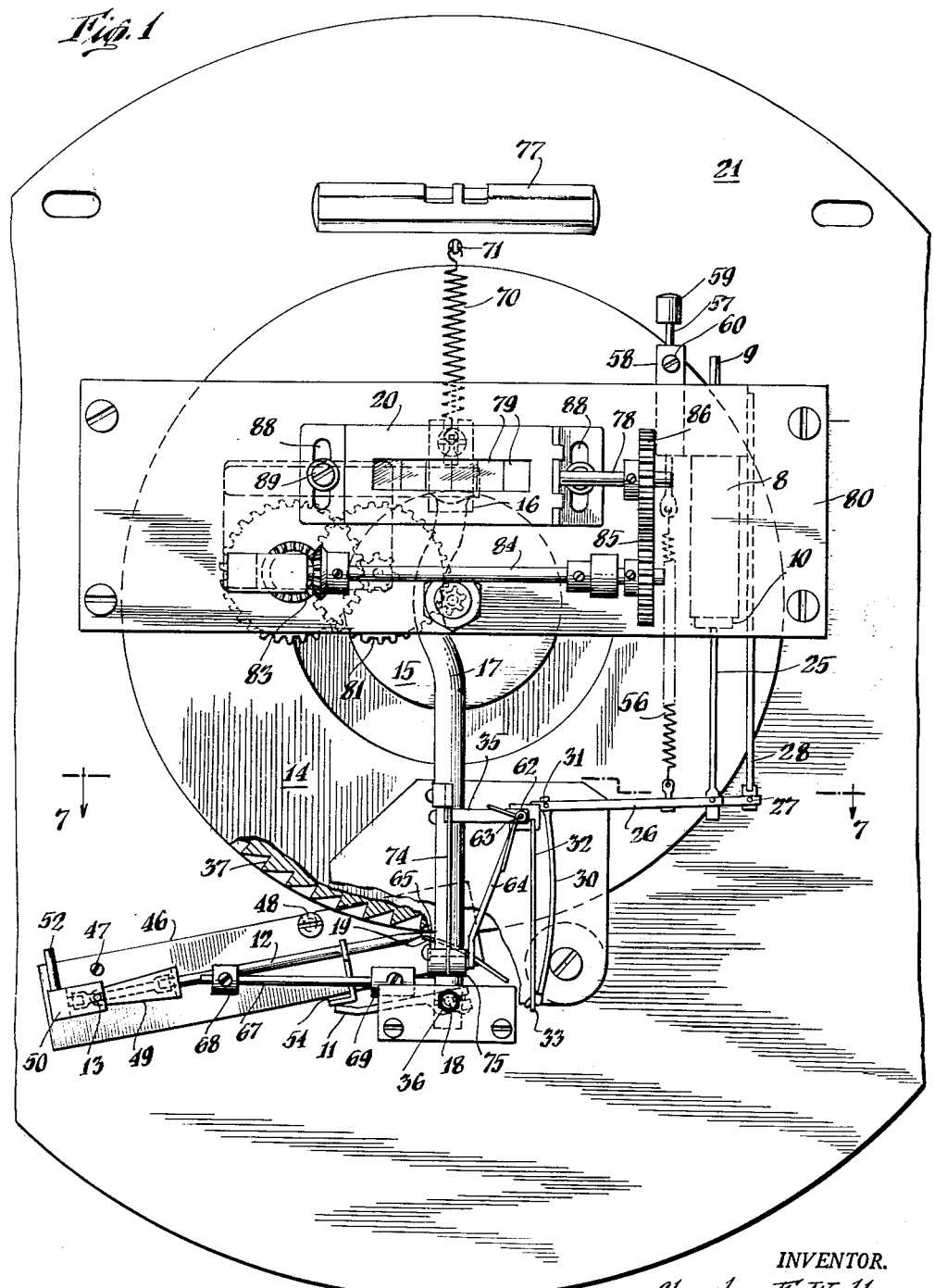
Fig. 1 is a front elevation of the instrument.

As indicated, the illustrated instrument is designed to provide a totalized response to successive fluid pressure values, e. g. values of gas pressure, transmitted from a selected source (not shown), the integration being conveniently registered on a counter or like device. Certain fundamental elements of the apparatus will now be described, for preliminary understanding of the principles of operation (see Fig. 1). The fluid under pressure, for which totalization of pressure values is desired, is communicated to an inlet tube 9, which opens into the head of a cylinder 8 and there acts on a piston 10. The resulting force on the piston is transmitted through specific linkage (as described below) to effect positional adjustment of an element or arm 11 which is correspondingly arranged to swing a jet nozzle 12 about a pivot 13, the nozzle 12 being thus disposed to move toward and away from the bladed edge of a turbine wheel 14.

Mounted to rotate with the wheel 14, a disc 15 of copper or other suitably conductive structure is arranged to exert magnetic drag on a magnet device 16 which is itself mounted at the upper end of an arm 17 embodied in the linkage between the piston 10 and the jet-positioning arm 11. The arm 17 is conveniently directly mounted with the arm 11 so that these elements are pivoted to move together, about the pivot axis 18. Specifically, the arrangement of the magnet 16 and the disc 15, as related to the pivoted jet device 12 and the turbine wheel 14, is such that the force of the eddy current drag set up by the copper disc 15 upon the magnet tends to turn the jet-positioning arm 11 in an opposite direction (e. g. counterclockwise as seen in Figs. 1 and 5) to the rotative tendency which is transmitted to the element 11 through the piston 10, i. e. the force corresponding to the received pressure in the cylinder 8.

Figure 5:
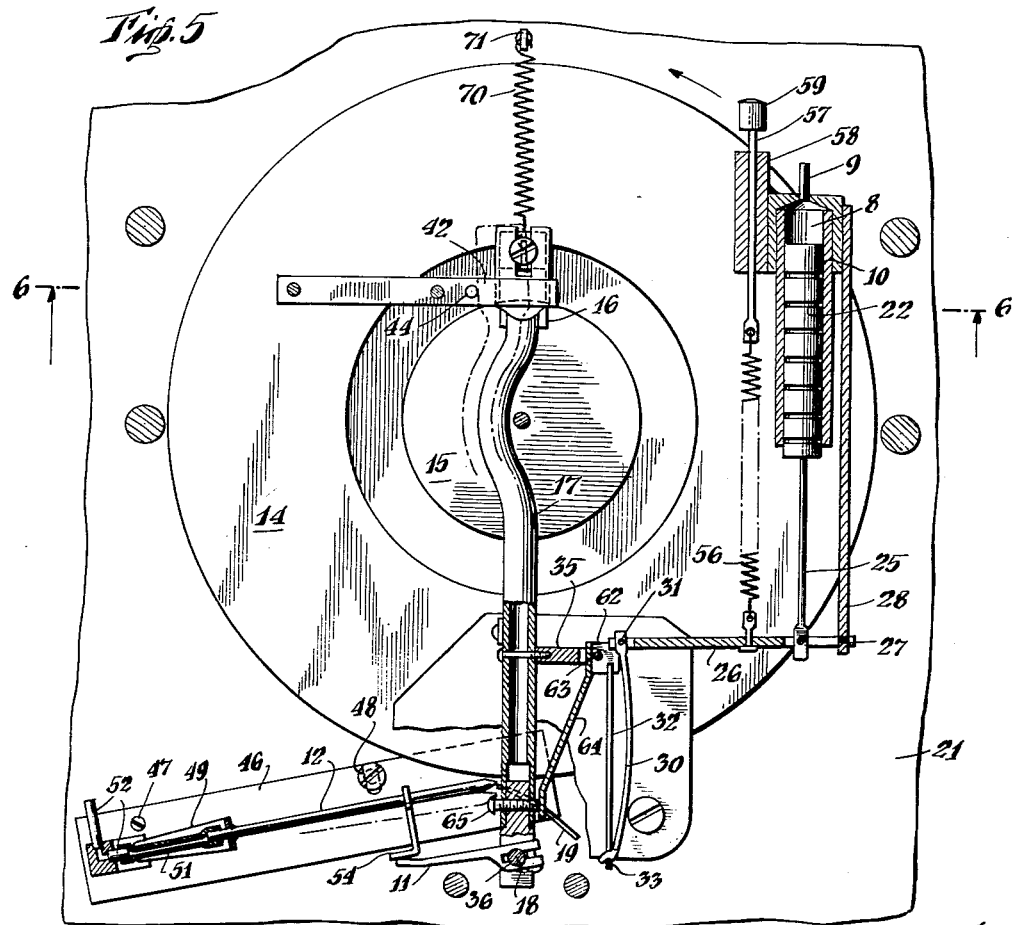
Fig. 5 is an elevational view, chiefly in vertical section, on line 5—5 of Fig. 2.

Bearing in mind that a stream of air or other suitable gas is continuously delivered through the jet nozzle 12 with the object of continuously rotating the turbine wheel 14 (e. g. counterclockwise as seen in Figs. 1 and 5), it may now be explained that the pressure in the cylinder 8 tends to cause the jet nozzle 12 to move closer to the wheel and thus to increase its speed, while at the same time the force due to the drag of the copper disc on the magnet 16, mounted on the arm 17, tends to move the arm 11 in an opposite direction, i. e. in a direction to permit the jet nozzle 12 to fall away from the edge of the turbine wheel. Specifically, the force exerted on the assembly movable about the pivot 18 by the pressure in the cylinder 8 is opposed by the force of the magnetic drag, the former force being proportional to the pressure under measurement and the latter force being proportional to the speed of rotation of the wheel.

In consequence, for any given pressure communicated to the cylinder 8 within the range to which the apparatus is designed to respond, a condition of balance is reached between these forces and is represented by a corresponding, specific speed of rotation of the turbine wheel, thus proportional to the value of the pressure in the cylinder 8. As will be apparent, the condition of balance is achieved, upon any change of pressure in the cylinder, by essentially instantaneous re-positioning of the jet nozzle 12, either slightly closer or slightly further from the edge of the wheel 14, so as to provide the precise energization of the rotating assembly that corresponds to the speed at which the forces are in balance.

When the force communicated through the linkage from the piston 10 is zero, as representative of zero or other lower pressure limit, the apparatus will endeavor to come to balance with a zero opposing force on the magnet 16, and thus with the wheel 14 endeavoring to come to rest. However, provision of a positive cut-off at the zero position and avoidance of a large path of swing for the jet nozzle 12 is achieved by the inclusion of a stationary deflection plate 19 (see Figs. 1, 3, 5 and 7), disposed adjacent the outlet opening of the jet nozzle 12, at the lower position of the latter. Specifically, the deflection plate is disposed so that when the jet nozzle moves to a position representative of zero pressure, its opening is below the deflection plate, thus positively interrupting the drive of the turbine wheel 14.

As described, the turbine wheel 14 represents a cyclically moving, e. g. continuously rotating element which has a rate of operation that corresponds directly to the pressure communicated in the cylinder 8, the speed of the wheel increasing with increase of such pressure and, vice versa. Accordingly means are appropriately coupled to the wheel 14, for counting its revolutions and thus providing an indication or other translation of the total movement of the wheel, which indication therefore represents a totalization of the pressure values communicated to the apparatus over any given period of time. By way of example, the indicating means may comprise a counter 20, driven by the wheel 14 as explained hereinbelow.

To describe the several elements of the device of Figs. 1 to 7 in more detail, it will be noted that the entire instrument is conveniently mounted on an upright back plate 21, the cylinder 8 being fixedly secured to the plate, as shown. The piston 10 (shown in detail in Fig. 4) is advantageously of elongated character, to provide effective freedom of motion axially of the cylinder, with essentially little or no leakage of the gas or other fluid which is communicated through a tube 9, it being remembered that while actual displacement of the piston may be very small, the transmitted force should be truly representative of the applied pressure, without varying effects of friction or leakage. As shown, the outer surface of the piston may have a series of spaced, circumferential grooves 22, to facilitate mobility and avoid effects of foreign particles or the like. Although diaphragm or other expansible chamber means may sometimes be employed for converting received pressure into a controlling force, the cylinder and piston arrangement is unusually advantageous for high accuracy of response at all times.

Mounted inside the piston 10, a swivel element 23 pivotally supports the upper end of a vertically extending rod 25, which in turn constitutes part of the operative linkage mentioned above. It will be noted that for improved accuracy of translation of the communicated fluid pressure into force on the rod 25, the upper end of the rod is pointed as indicated at 24 and is adapted to engage the inner end of a corresponding conical seat in the swivel element 23, the pivot mounting of the rod having sufficient play so that the force of the piston is communicated directly and in a constant manner (and from the same single, central point of the piston) to the end of the rod 25, at all times when pressure is present in the cylinder. At its lower end the rod 25 is pivoted to a horizontal arm or lever 26 (see Figs. 1 and 5), which is in turn pivoted about a stationary point 27 at the lower end of a stationary supporting arm 28.

The opposite end of the arm 26 is preferably considerably more remote from the pivotal connection of the piston rod 25, than is the point 27, in order to afford a desired mechanical advantage in the lever system. At its stated, more remote end, the arm 26 is provided with pivotal connection to the above described assembly of the magnet arm 17 and the jet-positioning arm 11, which rocks about the pivot 18. Specifically, this connection comprises essentially a link or rod 30 pivoted at its upper end to the arm 26 and having its lower end pivotally bearing on an appropriate transverse portion 33 of a bimetallic strip assembly 32, which in turn extends upwardly to substantially the same locality as the upper pivot 31 of the rod 30. The upper end of the bimetallic element 32 is connected, in effect rigidly, at the outer end of a bracket 35 which is in turn secured on the magnet arm 17 at a suitable locality spaced above the pivot 18.

As stated above, the magnet arm 17 and the jet-positioning arm 11 are mounted together, for example on horizontal pivot shaft 36 to rock about the corresponding pivot axis 18. It will now be seen that by the described linkage, force exerted on the piston rod 25, e. g. downwardly, is transmitted into torque on the pivot shaft 36, tending to rock the assembly of the arms 17 and 11 in a clockwise direction as seen in Figs. 1 and 5.

As also explained, the apparatus includes means responsive to an air jet or like device, for providing a rotating or other cyclic motion, to be controlled in accordance with a balance of forces in the instrumentalities last above described. While other turbine or like air-operated means may be employed, the simple turbine wheel 14, as shown, has been found effective and abundantly powerful, comprising a disc of appropriately large diameter having a multiplicity of turbine blades or notches around its peripheral edge, for example the cup-shaped indentations 37 (Figs. 1, 2 and 3) arranged for response to the air jet projected from the nozzle 12, to turn the wheel in a counterclockwise direction, as seen in Figs. 1 and 5.

While the self-balancing nature of the means for controlling the speed of the wheel 14 is such as to make the response of the apparatus essentially independent of friction or variations of frictional drag on the wheel, the latter, for optimum efficiency, is preferably mounted on a shaft 38 (see Figs. 2 and 3) seated at its ends in suitable anti-friction bearings such as indicated at 39 (see Fig. 3). The wheel 14 itself is also preferably of light weight construction, e. g. of appropriate plastic, or metal, or other light material having suitable rigidity and such that the inertia of the wheel is relatively small, facilitating its prompt response in change of speed at desired times.

As indicated, the arm 17 carries means responsive to the speed of rotation of the wheel 14, for applying an opposing force in the lever system, such means being advantageously of a magnetic or electromagnetic character and thus essentially free of friction or the like. The particularly simple arrangement shown, comprises the conductive disc 15 (see Figs. 1, 2, 3, 5 and 6) which is preferably made of copper (although other metals such as aluminum may be used), with the permanent magnet device 16 adjacent an outer region of the disc so that an eddy current drag is created between the disc and the magnet. Preferably the magnet is of horseshoe or bipolar type as shown, e. g. involving a pair of permanent magnets 16a, 16b (see Figs. 2, 3 and 6) on opposite sides of the disc, with their outer ends bridged by a supporting element 41 (see Figs. 2 and 3) which thus constitutes a yoke for the magnets and provides the desired horseshoe configuration. It will be appreciated that the magnetic field through the edge regions of the disc is thus greatly strengthened over an arrangement where only a single magnet is employed on one face of the disc.

The magnet assembly 16 is carried at the upper end of the arm 17, the relation of the pivot 18 and the axis of the disc shaft 38 being such that the radial distance of the magnet from the shaft 38 does not change appreciably through the small range of movement of the magnet. Hence the actual drag force exerted on the magnet and thus on the arm 17 may be deemed independent of the actual position of the magnet, in operation. While theoretical optimum conditions in this respect are attainable by locating the pivot axis 18 of the lever system to coincide with the axis of the wheel and disc shaft 38, the illustrated arrangement has been found highly accurate, while affording a compact arrangement of the parts.

Figure 6:
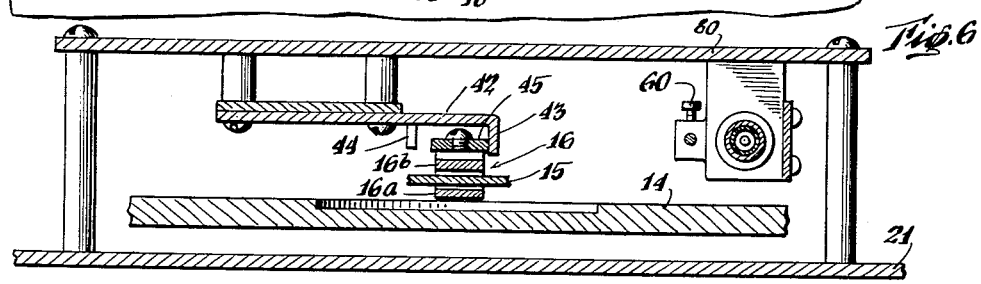
Fig. 6 is an enlarged detail taken in horizontal section on line 6—6 of Fig. 5.

Limiting means, to prevent injury to the lever assembly, may comprise stop means associated with the upper end of the arm 17. Thus a stationary arm 42 (see Figs. 5 and 6) is arranged to provide a stop element 43 at one end and a spaced stop pin 44, each to be engaged by a supporting portion 45 (as seen in Fig. 6) of the magnet bracket 41, at predetermined limiting positions, i. e. somewhat beyond the normal operating range of the instrument.

A convenient arrangement for the swinging jet nozzle 12 is shown in Figs. 1, 2, 5 and 6, comprising a supporting plate 46 adjustably secured to the base plate 21 as by means of the screws 47 and 48, the screw 48 traversing a notch in the plate 46 so that the position of the plate 46 may be pre-adjusted in an exact manner. The tube comprising the jet nozzle 12 is mounted at its end remote from the wheel 14, in a bracket 49 (see Figs. 1, 5 and 7) which is pivoted on the axis 13 in a corresponding support 50 carried by the plate 46. Flexible tubing 51 provides communication between the nozzle tube 12 and air inlet structure indicated at 52 in the member 50. The nozzle tube 12 also carries a downwardly projecting foot 54 which rests upon the arm 11, for the jet-positioning action of the latter as explained above. While in some cases spring or other means may be employed for urging the nozzle 12 downwardly to keep the foot 54 against the arm 11, the weight of the nozzle and bracket assembly 12—49 has been found sufficient for such purpose in the illustrated upright type of instrument.

It may here be noted that the pivot point 18 of the lever system, the pivot point 13 of jet nozzle 12, and the bearing point between the arm 11 and the foot 54 are arranged in substantially a single straight line. With such relationship of the parts, sliding friction at the bearing point between the arm 11 and the nozzle foot 54 is reduced to a minimum, i. e. as distinguished from nonlinear positioning of the three localities wherein mutual lateral displacement of the arm and foot might occur as the lever assembly is rocked.

While if the apparatus is intended to respond directly to pressures varying from a zero value (i. e. atmospheric pressure) upwards, no preliminary bias is necessary on the lever assembly, means may be provided to that end where the range of the illustrated instrument is to be extended between values that both depart from atmospheric. Suitable means for this purpose may comprise a spring 56 (see Figs. 1 and 5), e. g. a coil spring under tension, extending from a locality of the arm 26 (which is spaced substantially from its fulcrum 27) to a supporting rod 57 adjustably retained in a collar or like stationary member 58. Thus the tension on the spring 56 may be adjusted by moving the rod 57 inward or outward by its knob 59, the rod being then secured in its adjusted position by the set screw 60 (see Fig. 1). It will be understood that in this manner a preliminary tension or bias is applied to the lever system, e. g. to correspond to a predetermined minimum pressure which must be reached in the cylinder 8 before the apparatus is responsive to actuate the wheel 14.

The lever assembly is designed, in the instrument shown, to have a static balance about the pivot axis 18, and to that end means are provided for adjustment of the lever ratios or the weight of the lever arms about the pivot axis. Specifically, a relatively large or coarse adjustment is afforded by means intermediate the bimetal 32 and the arm 17, comprising a block 62 to which the upper end of the bimetal 32 is secured and which is pivoted (at the point 63) at the end of the bracket 35 that extends from the arm 17. The block 62 also carries a spring-loaded arm 64 which is thus biased to seat firmly against the end of a screw 65, threaded in the base portion of the arm 17. It will now be seen that adjustment of the screw 65 swings the arm 64, the block 62 and the bimetal 32 as a unit, therefore adjusting the effective lever arm distance from the pivot 18 to the pivot 33. Although for clarity in the drawing the pivot 31 at the end of the arm 26 is shown as slightly laterally spaced from the upper end of the bimetal 32, a preferred design is to have this pivot point precisely at or above the upper end of the bimetal, i. e. in the operating range, so that there is essentially no sidewise thrust against which the bimetal must work in its corrective function as described below.

For further, fine adjustment of the static balance, the arm 17 may also carry a projecting arm or beam 67 (see Figs. 1, 2 and 7), with adjustable weight means 68, 69. Whereas adjustment of the lever ratio by the screw 65 and the spring-pressed arm 64 effects the same percentage adjustment throughout the entire range or scale of the instrument, the weights 68, 69 afford a more sensitive adjustment, to provide maximum accuracy at the low end of the range. That is to say, in preliminarily adjusting the apparatus, the weights 68, 69 are shifted to attain balance when the instrument is running at a low value of its pressure range, say at 10% of its maximum speed. At the higher speeds of the wheel, the tendency of the force exerted on the arm 17 to upset the balance is proportionately much larger, so that at such speeds adjustment of the weights is likely to be masked.

For optimum accuracy and sensitivity, a relatively light spring 70 (see Figs. 1, 2, 3 and 5) is maintained under tension between the top of the arm 17 and appropriate supporting means 71 projecting from an upper part of the plate 21. The spring 70 serves to maintain the desired static balance of the lever assembly as it pivots, through the indicated small range, about the point 18, the spring thus serving to counterbalance the torque set up (by gravity) when the center of gravity swings off a vertical line above the pivot point 18. Preferably the arrangement is such that the stated vertical position of the center of gravity, thus maintained by the spring 70, corresponds to a position of the jet nozzle 12 when it just reaches the point of cut-off, i. e. where the opening of the nozzle is just below the end of the deflection plate 19 and there is thus no movement of the turbine wheel 14.

In order to compensate for temperature variations which will cause variations in the drag of the eddy current disc and magnet combination, there is the bimetal element 32. This element tends to swing the pivot 33 closer or farther away from the pivot point 18, and in so doing changes the mechanical advantage of the linkage in order to compensate for the difference in drag due to temperature changes. By referring to Fig. 3, it may be seen that this bimetal element is conveniently made up of two separate, identical pieces with a vertically extending space between, where the linkage pivots at point 33. By reason of this preferred construction of the bimetallic element in two sections, a sufficiently strong member is provided to afford the necessary rigidity for this part of the lever assembly, while at the same time there is no difficulty due to transverse bending of the element, i. e. difficulty which might arise in the case of a single wide bimetallic strip, which would tend to bend across its width or horizontal dimension (Fig. 3) and thus around a vertical axis, as well as around a horizontal axis as desired. Furthermore, the structure provides accommodation for the essentially rigid rod 30 between the sections of the bimetallic strip, so that the upper end of the rod 30, i. e. the pivot 31, can be disposed, if desired, immediately above the end of the bimetal as explained above.

Figure 7:
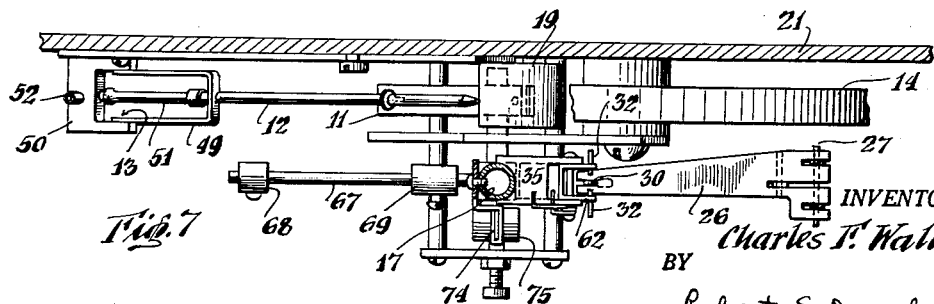
Fig. 7 is a horizontal section on line 7—7 of Fig. 1.

Since the changes of lever ratio effected by bending of the bimetal 32 necessarily disrupt the static balance of the parts pivoted about the point 18, further compensating means are preferably provided to maintain the desired static balance, despite the bending of the bimetal 32 in one direction or the other. For example, such means may comprise another bimetallic strip 74 secured at its upper end to the arm 17, adjacent the bracket 35, and carrying at its lower extremity a weight assembly 75, as shown in Figs. 1, 2 and 7.

It will be understood that an increase of temperature effects an increase in the electrical resistance of the copper disc 15, with the result of a decrease in the drag coupling; conversely a decrease in temperature decreases the resistance of the disc and increases the drag force exerted on the magnet 16. Assuming, for example, that an increase of temperature has occurred, the force exerted by the magnet and thus by the arm 17, in opposition to the force corresponding to the applied pressure in the cylinder 8, would be reduced. The arrangement of the bimetallic member 32, however, is such that it bends so as to move its lower end 33 closer to the pivot 18, i. e. the end 33 moving to the left as seen in Figs. 1 and 5. Therefore the lever arm by which torque is applied from the piston rod 25, about the pivot 18, is reduced so that the forces are in the desired state of balance with the jet nozzle 12 nevertheless properly positioned to correspond with the applied pressure in the cylinder 8. The shift of the coupling point 33, however, and consequent shortening of the lever arm has upset the static balance of the lever assembly, but the bimetal 74 is arranged to bend (in response to the same increase of temperature) in a way to restore balance, e. g. so that the weight 75 swings to the right (as seen in Fig. 1), toward pivot 33. Thus the change in lever ratio is precisely and automatically compensated by a shift of weight in the balanced assembly.

Upon a decrease in temperature the reverse operations occur, the bimetal 32 tending to move the point 33 to the right, i. e. away from the pivot 18, and the bimetal 74 swinging its weight 75 to the left for maintenance of static balance. In the arrangement illustrated, the bimetals 32 and 74 thus bend toward each other on an increase in temperature and away from each other on a decrease. In either case proper compensation is afforded for changes of resistance due to changes to temperature in the conductive disc 15, while desired static balance of the assembly is properly maintained by the further compensating means described.

If desired, the instrument may be provided with a level 77 (see Figs. 1, 2 and 3), e. g. of the spirit level type, secured to the plate 21, so that the instrument may be accurately positioned in use, to agree with the design or adjustment of the parts for desired static balance about the pivot 18.

As has been explained, the speed of rotation of the shaft 38 (which carries and is driven by the turbine wheel 14) is automatically proportioned, by the described means, to the pressure impressed in the cylinder 8, and the desired pressure totalization is conveniently effected by detecting the total travel of the rotating assembly over a given period, e. g. specifically by counting the revolutions of the shaft 38. While other counting or translating instrumentalities may be readily coupled to the shaft 38, the apparatus in the drawings includes, for purposes of illustration, a mechanical counter 20 (see Figs. 1, 2 and 3) which may of itself be of conventional construction, having a drive shaft 78 and providing visible index elements 79 to register the number of rotations made by the shaft 78 from an initial setting. The counter may be mounted on a stationary plate 80 secured to but spaced from the plate 21 as shown. Through appropriate spur gearing indicated at 81, the rotation of the shaft 38 is transmitted to rotate a parallel shaft 82 which is coupled by bevel gearing 83 to a transverse shaft 84, journaled in appropriate supports on the plate 80. By meshing gears 85, 86, respectively secured on the shafts 84 and 78, the described transmission is ultimately coupled to the counter 20 for operation of the latter to count the revolutions of the instrument shaft 38.

Means are conveniently provided to adjust the counting ratio between the counter 20 and the instrument shaft, e. g. so that the reading of the counter itself may be more conveniently calibrated with respect to the original quantity for which pressure readings are totalized. For instance, when the instrument is used in connection with a feeding or flow metering mechanism handling various types of grain or flour, the actual amounts of such material that correspond to a given pressure reading may vary with the kind of material, or there may be other changes in the relation of the communicated pressure to the amount of material fed. A convenient means for thus adjusting or calibrating the counter, to provide various ratios of its reading relative to the rotation of the shaft 38, comprises the slots 88 (see Fig. 1) of the counter structure by which the counter is mounted on the plate 80 by appropriate screws 89 as shown. Thus the counter may be set in any of a variety of positions relative to the shaft 84, so as to accommodate different sets of gears 85, 86, in correspondingly different gear ratios.

It will be understood that apparatus embodying the principles of the invention has a wide range of pressure response and may be readily designed or adapted, e. g. by adjustment or rearrangement of parts such as the spring 56 and the cylinder 8, for response to any of a variety of pressure ranges, including so-called negative, i. e. subatmospheric or vacuum pressures. By way of example of one effective use, an instrument of the specific design shown has been satisfactorily employed to totalize pressures (communicated through the tube 9) in a range of approximately 3 to 15 pounds, with high accuracy of response throughout the range. In this example the design and operation were such that the turbine wheel 14 (having a diameter of six inches) had a maximum speed of about 900 R. P. M., at the stated upper limit of positive pressure. The total range of movement of the outlet end of the jet nozzle 12, above the deflection plate 19, was about one-sixteenth of an inch. Air was supplied through the jet nozzles 12 at a pressure of approximately 30 pounds per square inch, the outlet orifice of the nozzle being between 0.015 and 0.018 inch in diameter.

It may be explained that no special or critical regulation of the pressure or flow of the driving air into the nozzle 12 is necessary. This is to say, any change in the pressure of the air supplied through the nozzle, which might tend to change the speed of the wheel 14, is immediately productive of a readjustment of the balanced assembly, so as to keep the wheel at the speed determined only by the pressure under measurement in the cylinder 8. For example, upon a change in flow of air through the nozzle 12, the parts immediately readjust themselves to alter the position of the nozzle, thus bringing the speed of the wheel back to its intended value or in effect preventing it from changing. Since the magnetic drag on the magnet 16 varies only with the speed of the wheel and since the drag must at all times be balanced by the force of the pressure-responsive piston 10 (in that any departure from balance is immediately productive of an adjustment of the jet nozzle 12 to change the wheel speed until balance is restored), the wheel speed is determined solely and directly by the pressure in the cylinder 8; the actual position of the jet nozzle is governed only by its effect on the speed of the wheel and will be automatically altered to keep that effect at the desired value, should the flow of the propelling air change.

By way of summary of the operations: the pressure to be integrated is introduced through tube 9 into the cylinder 8, and via the piston 10 and the linkage shown, tends to swing arm 17 and element 11 about the pivot point 18. This tends to position the jet nozzle 12 in relation to the turbine wheel 14, and as the turbine wheel moves, copper disc 15 is driven therewith and sets up a force on arm 17 through magnet 16, which force is in opposition to the force applied by piston 10 and its linkage. Therefore, for any given pressure applied, a balance of forces is obtained and a given speed of turbine wheel 14 follows. The total movement of the wheel, for example, is obtained by counting its revolutions with the counter 20 or other device coupled to the shaft 38, and accordingly affords the desired, totalized measurement of the applied pressure in the cylinder 8, over any desired period of time. The apparatus is unusually sensitive and accurate, yet is entirely rugged and reliable. Furthermore, effective compensation is afforded against temperature changes, while the readings are likewise unaffected by other variables, such as variations in the source of power, e. g. air supplied through the jet nozzle, for driving the totalizing instrumentalities.

While the illustrated apparatus has been primarily described as used for totalizing the pressure of air or other gas supplied to the cylinder 8, and while the invention is of special advantage in meeting the problems involved in such operation, it will be appreciated that the apparatus can also be employed for totalizing the pressure of other fluids, e. g. liquids, similarly communicated.

It is to be understood that the invention is not limited to the specific apparatus herein shown and described but may be embodied in other forms without departure from its spirit.

I claim:

1. Apparatus for totalizing values of fluid pressure, comprising a turbine wheel; means for determining the rate of rotation of said turbine wheel in proportion to the value of said pressure, comprising means including a movable nozzle for directing a stream of fluid against said turbine wheel to rotate it, means for moving said nozzle to change the angle between the stream and the wheel to adjust said rate of rotation, expansible chamber means for receiving said pressure, linkage means actuated by said expansible chamber means for causing said moving means to adjust said rate of rotation, and magnetic drag means responsive to said rate of rotation for arresting said adjustment at a predetermined rate of rotation; and translating means responsive to the number of revolutions of said turbine wheel.

2. Apparatus for totalizing values of fluid pressure, comprising a turbine wheel; means for determining the rate of rotation of said turbine wheel in proportion to the value of said pressure, comprising movable jet means for driving said turbine wheel, means for moving said jet to adjust said rate of rotation in response to force on such means, expansible chamber means for receiving said pressure, linkage means actuated by said expansible chamber means for applying force on said means for moving said jet, and magnetic drag means responsive to said rate of rotation for applying to said means for moving said jet a counter force acting in opposition to the force applied by said linkage means, whereby said rate of rotation is proportional to the value of said pressure; and translating means responsive to the number of revolutions of said turbine wheel.

3. Apparatus for totalizing values of fluid pressure, comprising a turbine wheel; means for determining the rate of rotation of said turbine wheel in proportion to the value of said pressure, comprising movable jet means for driving said turbine wheel, means for moving said jet to adjust said rate of rotation in response to force on such means, a cylinder and piston for receiving said pressure, linkage means actuated by said piston for applying force on said means for moving said jet, a conductive disc correspondingly rotated with said turbine wheel, and a magnet carried by pivotable arm means and located near the periphery of said disc, said pivotable arm means being integral with said means for moving said jet in such a way that the force on said magnet due to rotation of said disc is applied on said means for moving said jet in opposition to the force applied by said linkage means, whereby said rate of rotation is proportional to the value of said pressure; and translating means responsive to the number of revolutions of said turbine wheel.

4. Apparatus for totalizing values of fluid pressure, comprising a turbine wheel; means for determining the rate of rotation of said turbine wheel in proportion to the value of said pressure, comprising a jet nozzle adapted to be supplied by a source of fluid flow and movable toward and away from said turbine wheel, means for moving said jet nozzle to adjust said rate of rotation in response to force on such means, a cylinder and piston for receiving said pressure, linkage means actuated by said piston for applying force on said means for moving said jet nozzle, a conductive disc correspondingly rotated with said turbine wheel, and a magnet carried by pivotable arm means and located near the periphery of said disc, said pivotable arm means being integral with said means for moving said jet nozzle in such a way that the force on said magnet due to rotation of said disc is applied on said means for moving said jet nozzle in opposition to the force applied by said linkage means, whereby said rate of rotation is proportional to the value of said pressure; and translating means responsive to the number of revolutions of said turbine wheel.

5. Apparatus for totalizing values of fluid pressure, comprising a turbine wheel; means for determining the rate of rotation of said turbine wheel in proportion to the value of said pressure, comprising a jet nozzle adapted to be supplied by a source of fluid flow and movable toward and away from said turbine wheel, a pivoted member for moving said jet nozzle to adjust said rate of rotation in response to torque on said member, a cylinder and piston for receiving said pressure, linkage means actuated by said piston for applying torque to said member, said linkage means including a piston rod having a center point bearing on said piston for accurately transmitting said torque, a conductive disc correspondingly rotated with said turbine wheel, and a magnet carried by pivotable arm means and located near the periphery of said disc, said pivotable arm means being integrally attached to said pivoted member so that the force on said magnet due to rotation of said disc applies a torque to said member in opposition to the torque applied by said linkage means, whereby said rate of rotation is proportional to the value of said pressure; and translating means responsive to the number of revolutions of said turbine wheel.

6. Apparatus for totalizing values of fluid pressure, comprising a turbine wheel; means for determining the rate of rotation of said turbine wheel in proportion to the value of said pressure, comprising a jet nozzle adapted to be supplied by a source of fluid flow and movable toward and away from said turbine wheel, a pivoted member for moving said jet nozzle to adjust said rate of rotation in response to torque on said member, means responsive to said fluid pressure to apply to said pivoted member a torque proportional to said pressure, a deflection plate located at the more remote position of said jet nozzle for effecting complete cut off of said jet relative to said turbine wheel at a datum level of said pressure, a conductive disc correspondingly rotated with said turbine wheel, and a magnet carried by pivotable arm means and located near the periphery of said disc, said pivotable arm means being integrally attached to said pivoted member so that the force on said magnet due to rotation of said disc applies a torque to said member in opposition to the torque applied by said pressure responsive means, whereby said rate of rotation is proportional to the value of said pressure; and translating means responsive to the number of revolutions of said turbine wheel.

7. Apparatus for totalizing values of fluid pressure, comprising a turbine wheel; means for determining the rate of rotation of said turbine wheel in proportion to the value of said pressure, comprising a jet nozzle adapted to be supplied by a source of fluid pressure and movable toward and away from said turbine wheel, a pivoted member for moving said jet nozzle to adjust said rate of rotation in response to torque on said member, a cylinder and piston for receiving said pressure, linkage means actuated by said piston for applying torque on said member, said linkage means including a balanced assembly integral with and carried by the same pivot as said member, a conductive disc correspondingly rotated with said turbine wheel, and a magnet carried by pivotable arm means and located near the periphery of said disc, said pivotable arm means being integrally attached to said pivoted member and to said balanced assembly so that the force on said magnet due to rotation of said disc applies a torque to said member in opposition to the torque applied by said linkage means, whereby said rate of rotation is proportional to the value of said pressure; and translating means responsive to the number of revolutions of said turbine wheel.

8. Apparatus for totalizing values of fluid pressure, comprising a turbine wheel; means for determining the rate of rotation of said turbine wheel in proportion to the value of said pressure, comprising a jet nozzle adapted to be supplied by a source of fluid pressure and movable toward and away from said turbine wheel, a pivoted member for moving said jet nozzle to adjust said rate of rotation in response to torque on said member, a cylinder and piston for receiving said pressure, linkage means actuated by said piston for applying torque on said member, said linkage means including a balanced assembly integral with and carried by the same pivot as said member, adjusting means for adjusting the state of balance of said assembly, a conductive disc correspondingly rotated with said turbine wheel, and a magnet carried by pivotable arm means and located near the periphery of said disc, said pivotable arm means being integrally attached to said pivoted member and to said balanced assembly so that the force on said magnet due to rotation of said disc applies a torque to said member in opposition to the torque applied by said linkage means, whereby said rate of rotation is proportional to the value of said pressure; and translating means responsive to the number of revolutions of said turbine wheel.

9. Apparatus for totalizing values of fluid pressure, comprising a turbine wheel; means for determining the rate of rotation of said turbine wheel in proportion to the value of said pressure, comprising a jet nozzle adapted to be supplied by a source of fluid flow and movable toward and away from said turbine wheel, a pivoted member for moving said jet nozzle to adjust said rate of rotation in response to torque on said member, a cylinder and piston for receiving said pressure, linkage means actuated by said piston for applying torque to said member, said linkage means including a piston rod having a center point bearing on said piston for accurately transmitting said torque, said linkage means further including spring means to adjust the response range of the apparatus, a conductive disc correspondingly rotated with said turbine wheel, and a magnet carried by pivotable arm means and located near the periphery of said disc, said pivotable arm means being integrally attached to said pivoted member so that the force on said magnet due to rotation of said disc applies a torque to said member in opposition to the torque applied by said linkage means, whereby said rate of rotation is proportional to the value of said pressure; and translating means responsive to the number of revolutions of said turbine wheel.

10. Apparatus for totalizing values of fluid pressure, comprising a turbine wheel; means for determining the rate of rotation of said turbine wheel in proportion to the value of said pressure, comprising a jet nozzle adapted to be supplied by a source of fluid flow and movable toward and away from said turbine wheel, a pivoted member for moving said jet nozzle to adjust said rate of rotation in response to torque on said member, a cylinder and piston for receiving said pressure, linkage means actuated by said piston for applying torque on said member, said linkage means including a balanced assembly integral with and carried by the same pivot as said member, a conductive disc correspondingly rotated with said turbine wheel, temperature compensating means integral with said balanced assembly to compensate for resistance changes in said conductive disc due to temperature, and a magnet carried by pivotable arm means and located near the periphery of said disc, said pivotable arm means being integrally attached to said pivoted member and to said balanced assembly so that the force on said magnet due to rotation of said disc applies a torque to said member in opposition to the torque applied by said linkage means, whereby said rate of rotation is proportional to the value of said pressure; and translating means responsive to the number of revolutions of said turbine wheel.

11. Apparatus for totalizing values of fluid pressure, comprising a turbine wheel; means for determining the rate of rotation of said turbine wheel in proportion to the value of said pressure, comprising a jet nozzle adapted to be supplied by a source of fluid flow and movable toward and away from said turbine wheel, a pivoted member for moving said jet nozzle to adjust said rate of rotation in response to torque on said member, a cylinder and piston for receiving said pressure, linkage means actuated by said piston for applying torque on said member, said linkage means including a balanced assembly integral with and carried by the same pivot as said member, a conductive disc correspondingly rotated with said turbine wheel, a bimetal element in said linkage means to compensate for resistance changes in said conductive disc due to temperature, other bimetal means integral with said balanced assembly to maintain static balance upon changes in temperature, and a magnet carried by pivotable arm means and located near the periphery of said disc, said pivotable arm means being integrally attached to said pivoted member and to said balanced assembly so that the force on said magnet due to rotation of said disc applies a torque to said member in opposition to the torque applied by said linkage means, whereby said rate of rotation is proportional to the value of said pressure; and translating means responsive to the number of revolutions of said turbine wheel.

12. Apparatus for totalizing values of fluid pressure, comprising a turbine wheel; means for determining the rate of rotation of said turbine wheel in proportion to the value of said pressure, comprising a jet nozzle adapted to be supplied by a source of fluid flow and movable toward and away from said turbine wheel, a deflection plate located at the more remote position of said jet nozzle for effecting complete cut off of said jet relative to said turbine wheel at datum level of said pressure, a pivoted member for moving said jet nozzle to vary said rate of rotation in response to torque on said member, a cylinder and piston for receiving said pressure, a linkage for applying torque to said member, said linkage including a piston rod having a center point bearing on said piston for accurately transmitting said torque, a balanced assembly integral with and carried by the same pivot as said member, lever arm adjustment means to adjust the torque applied to said member via said linkage, static balance adjustment means for adjusting the static balance of said balanced assembly, spring means attached to said balanced assembly to compensate for static unbalance due to shift in center of gravity of said balanced assembly upon movements thereof, range adjustment means for adjusting the response range of the apparatus, a conductive disc correspondingly rotated with said turbine wheel, a bimetal element in said linkage to compensate for resistance changes in said conductive disc due to temperature, other bimetal means integral with said balanced assembly to maintain static balance upon changes in temperature, and a magnet carried by pivotal arm means and located near the periphery of said disc, said pivotal arm means being integrally attached to said pivoted member and to said balanced assembly so that the force on said magnet due to rotation of said disc applies a torque to said member in opposition to the torque applied by said linkage means, whereby said rate of rotation is proportional to the value of said pressure; and counter means for indicating the number of revolutions of said turbine wheel.

13. Apparatus for totalizing values of fluid pressure, comprising a turbine wheel; means for determining the rate of rotation of said turbine wheel in proportion to the value of said pressure, comprising movable jet means for driving said turbine wheel, means for moving said jet to adjust said rate of rotation, a balanced assembly operatively connected to said means for moving said jet, expansible chamber means for receiving said pressure and applying a first force acting in one direction on said assembly, lever arm adjustment means to adjust said force, static balance adjustment means for adjusting the static balance of said balanced assembly, and magnetic drag means responsive to said rate of rotation and connected to said balanced assembly to apply thereto a second force acting in opposition to said first force, whereby said jet means is moved until said rate of rotation is proportional to the value of said pressure; and translating means responsive to the number of revolutions of said turbine wheel.

14. Apparatus for totalizing values of fluid pressure as defined in claim 13, including spring means attached to said balanced assembly to compensate for static unbalance due to shift in center of gravity of said balanced assembly upon movements thereof.

15. Apparatus for totalizing values of a variable quantity, comprising a turbine wheel; means for determining the rate of rotation of said turbine wheel in proportion to the value of said quantity, comprising movable jet means for driving said turbine wheel, means for moving said jet to adjust said rate of rotation, a balanced assembly operatively connected to said means for moving said jet, means responsive to said variable quantity for applying a first force acting in one direction on said assembly in proportion to the value of said variable quantity, and magnetic drag means responsive to said rate of rotation and connected to said balanced assembly to apply thereto a second force acting in opposition to said first force, whereby said jet means is moved until said rate of rotation is proportional to the value of said quantity; and translating means responsive to the number of revolutions of said turbine wheel.

16. Apparatus for controlling the rate of rotation of a rotatable member in proportion to the value of a variable quantity comprising a turbine wheel connected to said member for rotation therewith; means for determining the rate of rotation of said turbine wheel in proportion to the value of said quantity, comprising movable jet means for driving said turbine wheel, means for moving said jet to adjust said rate of rotation, a balanced assembly operatively connected to said means for moving said jet, means responsive to said variable quantity for applying a first force acting in one direction on said assembly in proportion to the value of said variable quantity, and magnetic drag means responsive to said rate of rotation and connected to said balanced assembly to apply thereto a second force acting in opposition to said first force, whereby said jet means is moved until said rate of rotation is proportional to the value of said quantity.

References Cited in the file of this patent

UNITED STATES PATENTS

| | | |
|---|---|---|
| 2,050,674 | Stover | Aug. 11, 1936 |
| 2,315,019 | Samuelson | Mar. 30, 1943 |
| 2,364,810 | Noxon | Dec. 12, 1944 |
| 2,575,304 | Stover | Nov. 13, 1951 |

FOREIGN PATENTS

| | | |
|---|---|---|
| 332,607 | Germany | Feb. 4, 1951 |
| 353,994 | Great Britain | Aug. 6, 1931 |